United States Patent [19]

Williams et al.

[11] Patent Number: 4,989,946
[45] Date of Patent: Feb. 5, 1991

[54] FIBER OPTIC SWITCH

[75] Inventors: Joseph C. Williams, Casanova; Sarah E. Goodman, Roanoke, both of Va.

[73] Assignee: Alcatel NA, Inc., Hickory, N.C.

[21] Appl. No.: 300,088

[22] Filed: Jan. 19, 1989

[51] Int. Cl.$^5$ .............................................. G02B 6/26
[52] U.S. Cl. ............................. 350/96.20; 350/96.21; 350/96.22
[58] Field of Search ............... 350/96.20, 96.21, 96.22

[56] References Cited

U.S. PATENT DOCUMENTS

| | | | |
|---|---|---|---|
| 3,936,143 | 2/1976 | Sato | 350/96.21 |
| 4,124,272 | 11/1978 | Henderson et al. | 350/96.21 |
| 4,229,068 | 10/1980 | Hodge et al. | 350/96.20 |
| 4,239,331 | 12/1980 | Aoyama | 350/96.20 |

FOREIGN PATENT DOCUMENTS 57-44106A  3/1982  Japan ................. 350/96.13

OTHER PUBLICATIONS

Conrad et al., "Fiber-Optic Switch", IBM Technical Disclosure Bulletin, vol. 20, No. 3, Aug. 1977.
Tanaka et al, "Simple and Reliable Optical Bypass Switch for Fiber-Optic Data Bus Application", 1981, p. P15-P15-4, 7th Eur. Conf. on Opt. Commun.

Primary Examiner—William L. Sikes
Assistant Examiner—Phan T. Heartney
Attorney, Agent, or Firm—Peter C. Van Der Sluys

[57] ABSTRACT

A fiber optic switch is formed using cylindrical or biconic fibers optic connector components for axially aligning pairs of fibers to be switched. The ferrules of the connector are rotatably mounted within an alignment sleeve, such that a pair of fibers in a first ferrule may be rotated relative to a pair of fibers mounted in a second ferrule to effect a bypass switch operation. Various forms of switch actuators, including rotary and linear actuators, are disclosed, along with fail-safe arrangements.

17 Claims, 5 Drawing Sheets

FIBER OPTIC SWITCH

BACKGROUND OF THE INVENTION

1. Field of the Invention

The present invention relates to fiber optic switches and, more particularly, to a switch wherein the optical fibers to be switched are coupled by a butt joint and are rotated relative to each other about an axis offset from an axis through the butt-joined fibers in order to effect switching.

2. Description of the Prior Art

There has been a long-standing need for a relatively inexpensive but precise fiber optic switch. It has been recognized that a key component needed for the practical implementation of optical fiber local area networks is a precision fiber optic switch, particularly a switch that can perform a bypass function.

Historically, fiber optic switches have been difficult to build because of the accurate mechanical alignment which must be maintained between the cores of the optical fibers being switched. Such precise alignment must be maintained in extreme environmental conditions and over many operating cycles.

Numerous schemes have been used to provide a precision fiber optic switch, and while some of these have proven somewhat successful, a low-cost precision switch has not yet been developed. Butt-joined optical fibers are usually switched by linear translation of the fibers relative to each other. In this type of switch considerable difficulty is experienced in attempting to attain the desired precision. Another switching technique makes use of an expanded-beam optical coupling between two fiber cores where switching is effected by manipulation of the optical beam between the fibers using devices such as lenses, prisms, gratings or mirrors. This type of switch becomes complex and expensive.

Mechanical type switches rely on displacing a fiber or a physical body containing the fiber to connect or disrupt the passage of light from one fiber to another. The optical fiber switch depends on the transverse mechanical motion of the fiber within a guide mechanism. Such fiber optic switches have been provided for switching a single optical fiber, or in the form of a multi-fiber switch array; however, the desired precision has not been achieved with consistency, and the switch is very sensitive to environmental conditions, particularly vibration.

Another type of mechanical switch is based on the electro-wetting effect wherein the switch operates by moving a mercury slug into and out of a collimated beam of light leaving a lens to allow the light to enter another similar lens or to reflect the light back through the lens to another optical fiber.

Several types of electro-optic switching mechanisms have been employed using such schemes as a frequency-tunable cleaved coupled cavity laser and a grating de-multiplexer. Pure optical switches have also been suggested for use in conjunction with magnetic fields employing Faraday rotation.

More recent attempts have been made to design optical fiber switches utilizing the switching effect of liquid crystals.

While some of these techniques hold great promise, they are extremely sophisticated and complex, resulting an unacceptably high cost and questionable reliability.

SUMMARY OF THE INVENTION

Many of the technical difficulties mentioned above were experienced in the optical fiber connector art where these difficulties were solved. The present invention makes full use of the existing fiber optic connector technology where considerable effort was expended in overcoming the difficulties of precisely aligning core regions of optical fibers to be connected. The optical fiber connector technology has reached a degree of maturity which has allowed optical fibers to be repeatedly aligned with an accuracy of better than 1 um.

Connectors which demonstrate this high performance level are widely available from multiple sources. Such connectors are known as the AT&T Biconic, AT&T ST, NTT FC, NEC D4, Sumitomo's Mini BNC and SMA 906 and 905. These connectors are off-the-shelf components. Multichannel connectors such as the Hughes Hermaphroditic and Cannon FOMC can also be used. The particular connector components can be selected depending upon the precision and durability required. The present invention makes use of standard off-the-shelf connector components to provide the required precision.

The invention contemplates fixing multiple fibers in each ferrule of a cylindrical optical fiber connector. The ferrule portions of the connector are rotated-relative to each other until proper alignment of the optical fibers is achieved. Thereafter, switching is provided by rotating the ferrules relative to each other through an angular distance depending upon the number of fibers inserted within each ferrule.

If two fibers are inserted in each ferrule, a relative rotation of 180 degrees will produce a desired bypass switch effect. As the ferrules are rotated relative to each other, the fibers travel along circular paths and may be brought into butt joint alignment with the fibers in the other ferrule. In multiple fiber applications where more than two fibers are fixed in each ferrule, a lesser degree of rotation would be required to achieve alignment of the respective optical fibers.

Thus, the present invention makes use of proven techniques used in the fiber optic connector art. As in the connector art, the fibers are placed into the ferrules and epoxied therein. The ends of the fibers are ground and polished to an optical surface which is recessed slightly below the plane of contact between adjacent ferrules. The ferrules are then mated in an elastic alignment sleeve with index matching lubricant disposed between the butt ends of the fibers.

A primary objective of the present invention is to provide an inexpensive fiber optic switch.

Another objective of the present invention is to provide a fiber optic switch having precise alignment.

Another objective of the invention is to utilize the proven technology employed in the fiber optic connector art in solving the alignment difficulties encountered in fiber optic switches.

Another objective is to provide a fiber optic bypass switch which would be useful in fiber optic local area networks.

The above and other objectives and advantages of the invention will become apparent from the following detailed description of the invention and by reference to the drawings referred to therein.

DETAILED DESCRIPTION OF THE INVENTION

Figure 1:
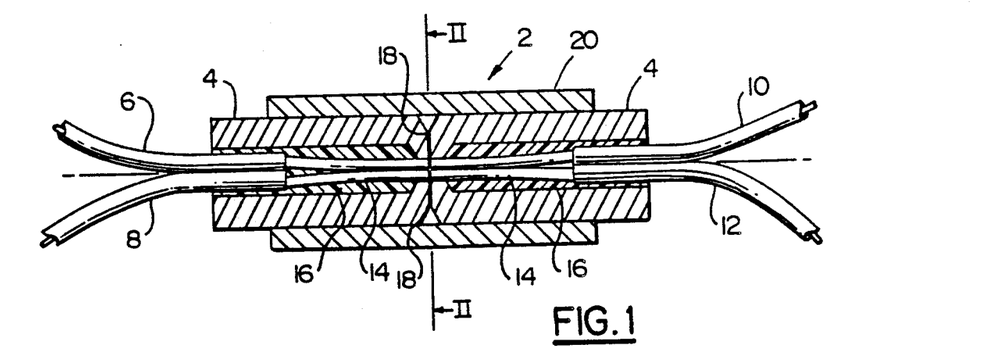
FIG. 1 is a partial vertical section showing schematically the switch of the present invention.

FIG. 1 schematically illustrates in partial section an embodiment of the switch which is particularly useful as a LAN bypass switch. Switch 2 shown in FIG. 1 includes two ferrules 4, each receiving a pair of optical fibers 6, 8, and 10, 12. The optical fiber coating is stripped from a portion of each fiber exposing the bare optical fiber, as shown at 14. Each pair of fibers is inserted into the respective ferrule and cemented therein using epoxy 16. The butt ends of the stripped fibers are ground and polished to an optical surface which is slightly recessed below the surfaces 18 of the ferrules. The butt ends of the fibers are coated with an index matching lubricant, and the ferrules are inserted into an alignment sleeve 20 so that surfaces 18 abut each other, completing the basic assembly of the switch.

Figure 2:
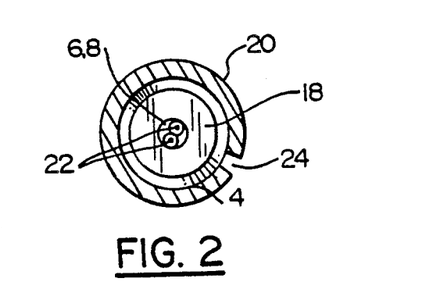
FIG. 2 is a vertical section taken along line II—II of FIG. 1.

FIG. 2 is a sectional view taken along lines II—II of FIG. 1 and shows a ferrule 4 including surface 18 thereof. Optical fibers 6 and 8 having core regions 22, are shown mounted in an aperture of the ferrule. The alignment sleeve 20 may be split, as at 24, to provide a degree of resilience and to allow for rotation of the ferrules.

The ferrule must be selected to have an aperture with a diameter very close to twice the diameter of the fiber to be connected. In this way the fiber cores will be 180 degrees apart and will both be on a single line through the center of the aperture, and good alignment with another pair of fibers is possible. If the ferrule aperture is too large, the fiber cores may not be 180 degrees apart and may not be on a line through the center of the aperture. In such case alignment will be possible only if the other fiber pair is similarly misaligned.

After assembly of the switch, the cores 22 of the fibers 6 and 8 must be aligned with the cores of the fibers 10 and 12 respectively. Accordingly, the fibers are connected to light sources and detectors, and one of the ferrules 4 is manually rotated until maximum light output is detected, indicating proper alignment of the fiber cores. After this alignment is achieved, the proper location of the ferrules in regard to the alignment sleeve 20 is noted on the ferrules and the sleeve. One of the ferrules is then fixed within the sleeve 20 by the application of epoxy or solder, and the other ferrule is rotated approximately 180 degrees until maximum light output is again noted, at which point another indication is made on the ferrule and sleeve 20. Thereafter, switching may be accomplished by the manual rotation of the rotatable ferrule within the alignment sleeve 20.

Figure 3A:
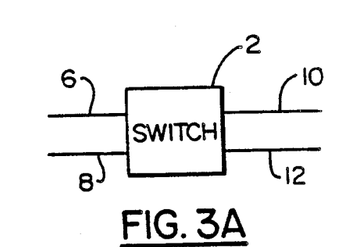
FIGS. 3a and 3b are schematic diagrams showing the interconnections made by the switch.
Figure 3B:
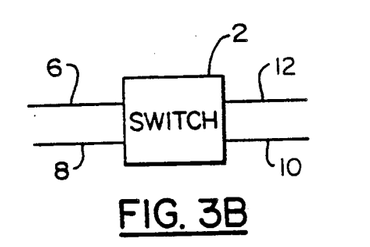

FIG. 3a shows a simple schematic of the optical fiber switch as it may be connected as a bypass switch for a LAN. Assuming the LAN comprises a ring network, fiber 6 would be connected as an input from the ring to the switch 2. Fiber 10 would provide a line output to the ring. Fiber 8 would be connected to a transmitter of a device connected to the LAN, while fiber 12 would be connected to the receiver of such a device. In normal operation, fiber 6 would be connected to fiber 10 with the device isolated from the LAN. When it is desired to connect the device into the LAN, the switch is rotated 180 degrees, between the indicia on the switch, and fiber 6 providing the input from the LAN is connected to fiber 12 or to the receiver of the device, while fiber 8 from the transmitter is connected to fiber 10, which is the output to the LAN. This configuration is shown in FIG. 3b.

Figure 4:
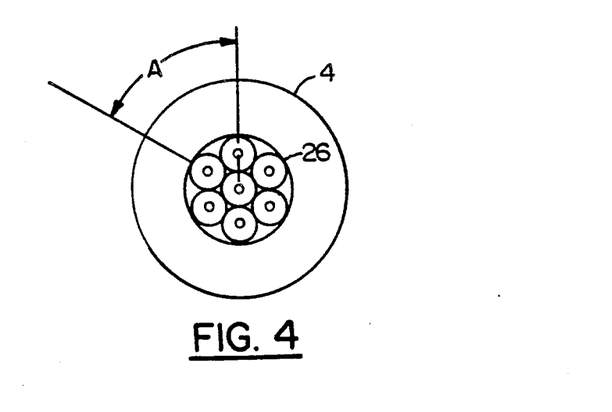
FIG. 4 is a vertical section of a switch providing for the switching of multiple pairs of optical fibers.

FIG. 4 illustrates another embodiment where multiple fibers are provided in each ferrule for more possible connections with various switch poles and throws. FIG. 4 shows an embodiment wherein seven fibers 26 may be disposed within a ferrule 4. The fibers are arranged so that six fibers are disposed around a central fiber which would not be switchable. The central fiber could be replaced by a dummy center member. In the embodiment shown in FIG. 4, switching can be accomplished by rotation of the ferrule through less than 180 degrees and, more particularly, an angle A which would be 60 degrees when six fibers are disposed about the center member. The additional fibers may be used to provide more switches or may be connected to each other in various combinations with filters or fiber links to produce complex functions such as delay lines or band pass filters. Another potential use for the switch would be as a variable fiber optic attenuator, where the ferrule 4 is rotated slightly to produce an intentional misalignment, resulting in a controlled attenuation.

The switch can be used to switch a single fiber, in which case a dummy filler would be used to replace one fiber so that proper alignment of the fiber in the ferrule aperture is assured. Alternately, the ferrule could be provided with an aperture offset from the axis of the ferrule with said aperture having a diameter only slightly larger than the fiber.

Figure 5:
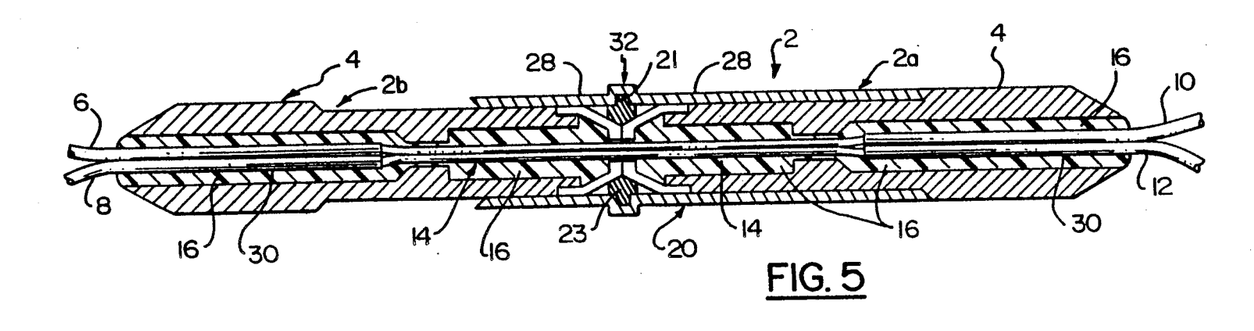
FIG. 5 is a partial vertical section of a schematic representation in greater detail showing the structure of the switch.

FIG. 5 is a vertical section of a schematic representation of a switch embodiment formed using standard connector parts available from Hughes. The switch 2 is formed using a Hughes socket terminus assembly 2a, part number 1093202S, and a pin terminus assembly 2b, part number 1093201S. The socket terminus 2a includes an alignment sleeve 20, a ferrule 4 mounted in said alignment sleeve and a guide bushing 28 with a precise aperture formed therein for receiving the fibers. The alignment sleeve 20 has a notch 21 formed therein for receiving and supporting a spacer 23. The guide bushing 28 is mounted on ferrule 4 and engages spacer 23 when the ferrule 4 is inserted into the alignment sleeve 20.

Pin terminus 2b includes a ferrule 4 and a guide bushing 28 also having a precise aperture formed therein. Pin terminus 2b is adapted to be inserted into the alignment sleeve 20 of socket terminus 2a. Fibers 6, 8, 10 and 12 are inserted as pairs into the ferrules 4, said fibers having bare portions 14 and jacketed portions 30 disposed in each of the ferrules. The fibers are held within the ferrules by an epoxy 16.

The ends of the bare fibers are prepared as previously indicated by grinding and polishing to an optical surface which is slightly recessed within the guide bushings 28. The ends of the fibers are coated with an index matching lubricant and the pin terminus 2b is inserted into the alignment sleeve 20 of the socket terminus 2a until its guide bushing engages spacer 23, so that the fibers are butt joined at a switchpoint 32. Spacer 23 prevents actual contact between the end surfaces of the guide bushing to reduce wear and extend switch life.

The fibers used in the embodiment shown were 62.5/125 fibers having a core diameter of 62.5 um and a cladding diameter of 125 um. The available ferrules were altered slightly by drilling out the aperture to form an oversized opening to accept two fibers.

A typical fiber diameter specification for a 125 um fiber calls for the outer diameter tolerance to be plus or minus 1.25 um or one percent. A typical ceramic ferrule available from Kyocera has an aperture tolerance of minus 0 um, plus 1 um with a concentricity between the aperture and outer diameter of better than 1 um. Thus, commercially available products can be selected for the switch components and will provide the required tolerances without the need for modification.

After assembly of the switch mechanism, the switch is aligned and calibrated to indicate the proper fiber alignment by inscribing markings on the alignment sleeve 20 and ferrule 4 of the pin terminus 2b. This procedure is identical to that previously described. The ferrules 4 must be rotated relative to each other and either terminus assembly can be fixed with the other being rotated.

The above-described switch can be manually operated; however, for most applications, a switch actuator would be most useful. Accordingly, a number of proposed actuator structures will be described. The actuator structures to be described are adapted for use with the switch shown in FIG. 5 with the pin terminus assembly 2b being rotated and the socket terminus 2a being fixed.

Figure 6:
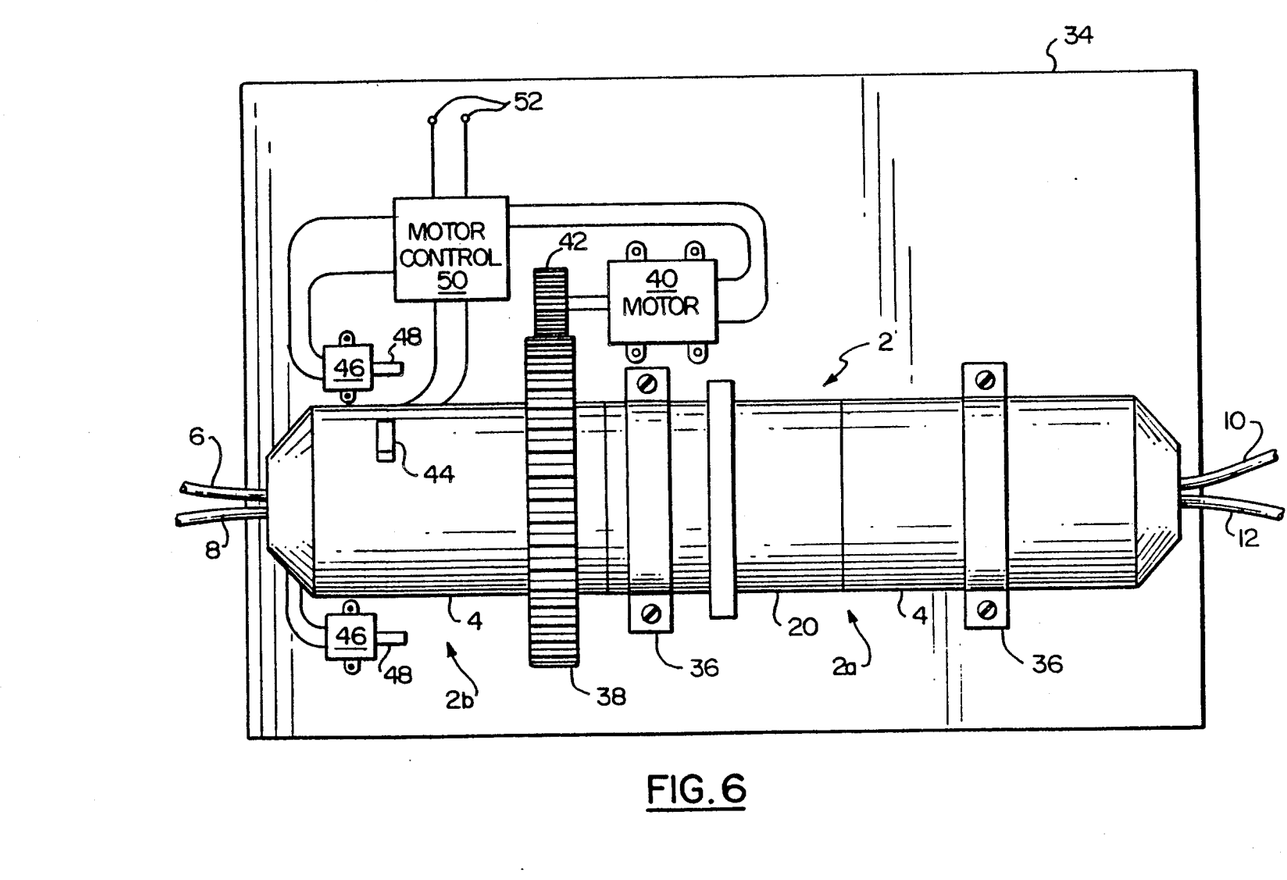
FIG. 6 is a schematic representation of the switch of the present invention and an actuator assembly.

Referring to FIG. 6, there is shown switch 2 comprising socket terminus 2a including alignment sleeve 20, pin terminus 2b and pairs of fibers 6, 8 and 10, 12. The switch 2 is mounted to a housing 34 by means of mounting brackets 36 so that the alignment sleeve 20 and the right-hand ferrule 4 are fixedly positioned. A large drive gear 38 is concentrically mounted around the left-hand ferrule 4. A small-sized motor 40 is mounted to the housing and has attached to its shaft a pinion 42 for driving the gear 38. The motor may be a small-sized DC motor which may be driven in either of two directions. Such motors are now readily available with diameters down to 8 mm. A switch-actuating stop 44 is attached to ferrule 4 for engaging the arms of two microswitches 46 which are mounted to the housing 34. Microswitches 46 are adjustably mounted to the housing 34 so that their actuating arms 48 are positioned to be engaged by stop 44 when ferrule 4 is rotated to the proper position relative to the alignment sleeve, so that maximum light coupling is achieved between the respective butt-joined fibers.

A motor control 50 is connected to the microswitches 46 and provides an output to motor 40 for driving said motor in the desired direction. Motor control 50 includes inputs 52 to which actuating signals may be applied.

Upon receipt of an actuating signal, the motor is driven in the desired direction until stop 44 engages the arm 48 of a microswitch, at which point the motor is turned off and the motor control reverses the drive signal so that upon the next actuation the motor will be driven in the opposite direction.

It should be noted that stop 44 is positioned at a much greater radial distance from the axis of rotation than are the fiber cores that are being positioned, thereby enhancing the precision of the angular distance through which the fibers are rotated. If the core of a fiber is centered 62.5 um from the axis of rotation and the stop is 6.25 mm from the axis, 1 mm of core motion corresponds to 100 mm of stop motion, thereby allowing for greater tolerances for microswitch actuation and positioning. This "leveraged position control" is a major advantage of the rotary type switch of the present invention over switches which must directly control fiber position to within several microns particularly in a vibrating environment.

Figure 7:
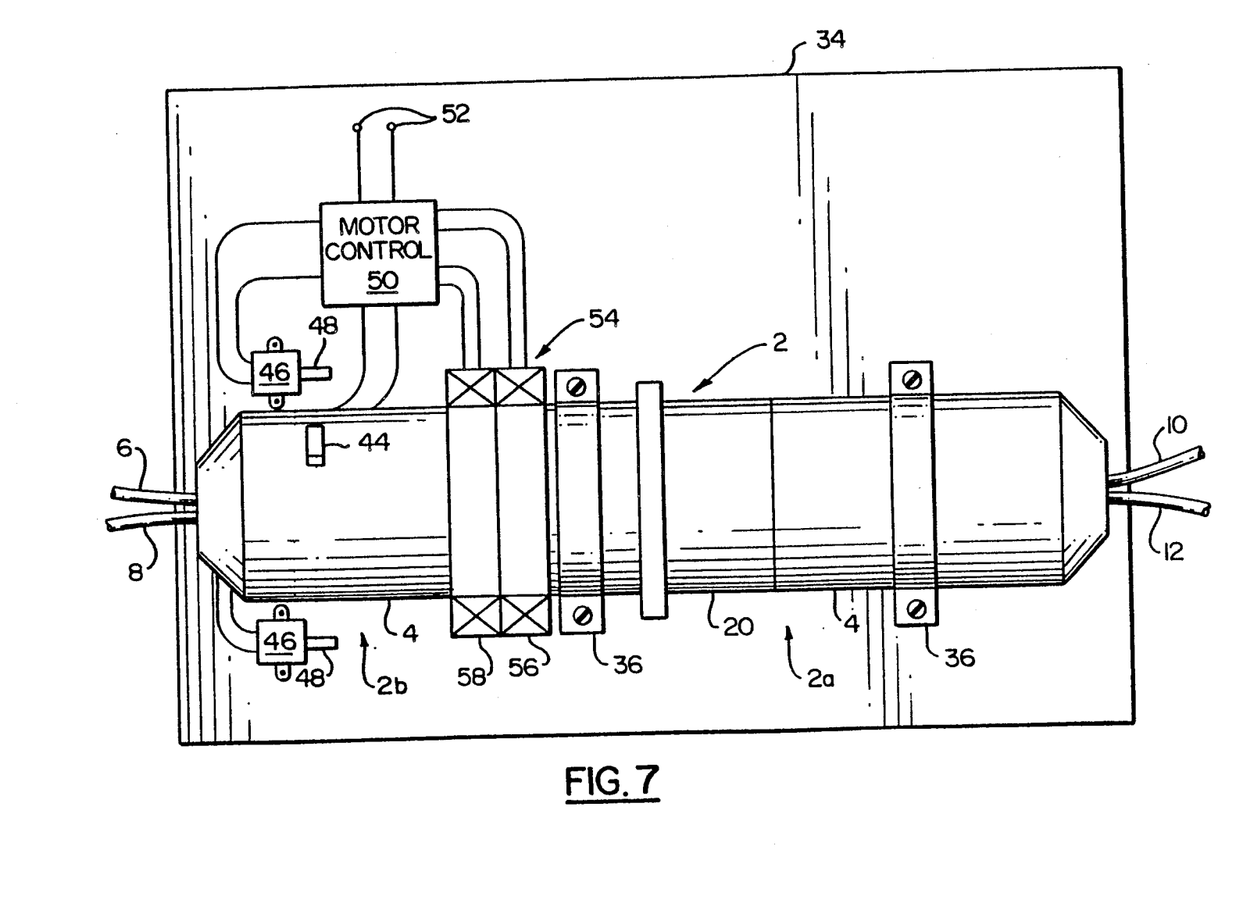
FIG. 7 schematically shows the switch with another actuator assembly.

It is desirable that ultimately the motor be constructed integrally with the switch 2. A schematic embodiment of such a structure is shown in FIG. 7, which is similar to FIG. 6, but with the gear 38, motor 40 and pinion 42 eliminated and replaced by an integral motor assembly 54 mounted concentrically on the switch 2. Motor assembly 54 includes a stator winding 56 fixedly mounted concentrically on the alignment sleeve 20 and a rotor winding 58 fixedly mounted concentrically on the left-hand ferrule 4. The stator and rotor mountings are fixed to the alignment sleeve and ferrule 4 so they are in juxtaposition for maximum interaction of their magnetic fields. A fixed magnet stator as used in coreless DC motor is preferred. The switch control operates in a manner similar to that of the switch shown in FIG. 6. A beneficial result of such a structure is that the magnetic fields will actually pull the ferrule 4 towards sleeve 20, thereby keeping the butt-joined fibers close together.

Figure 8:
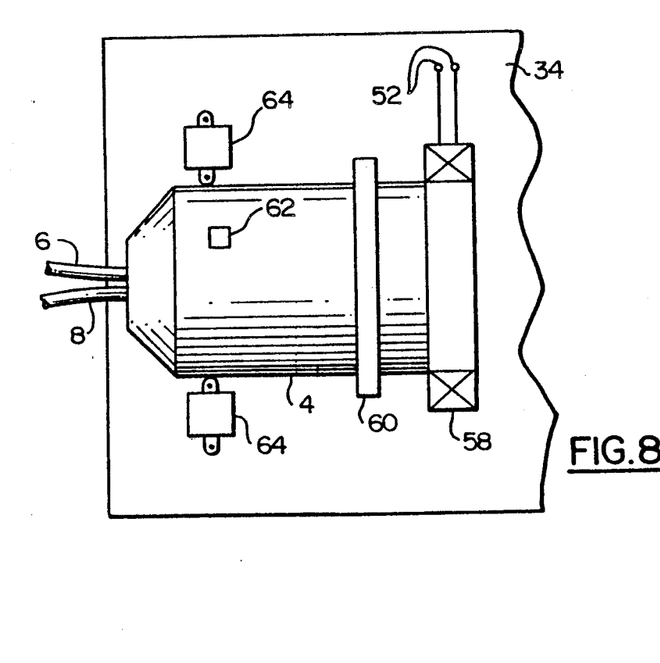
FIG. 8 shows a modification of the actuator assembly of FIG. 7.

FIG. 8 shows another modification of the switch of FIG. 7 where a fail-safe operation is provided. In FIG. 8 only the structure associated with the left-hand ferrule 4 is shown. The remaining structure of the switch 2 is identical to that shown in FIG. 7. In FIG. 8 the motor is driven only in one direction by rotor 58, while a spiral spring 60 is attached to ferrule 4 at one end thereof, and to housing 34 at another end, so as to drive the ferrule to a first alignment position wherein a stop member 62 engages a stop 64 adjustably mounted to housing 34. Upon activation of the rotor 58 the ferrule is driven in a direction against the spring 60 so that stop 62 engages another stop 64.

A disadvantage of this structure is that the motor must be continuously energized to hold the ferrule against the spring force and against the desired stop 64. An advantage of this design is that in the event of a power failure the spring will drive the ferrule to a fixed, predetermined, fail-safe position.

Figure 9:
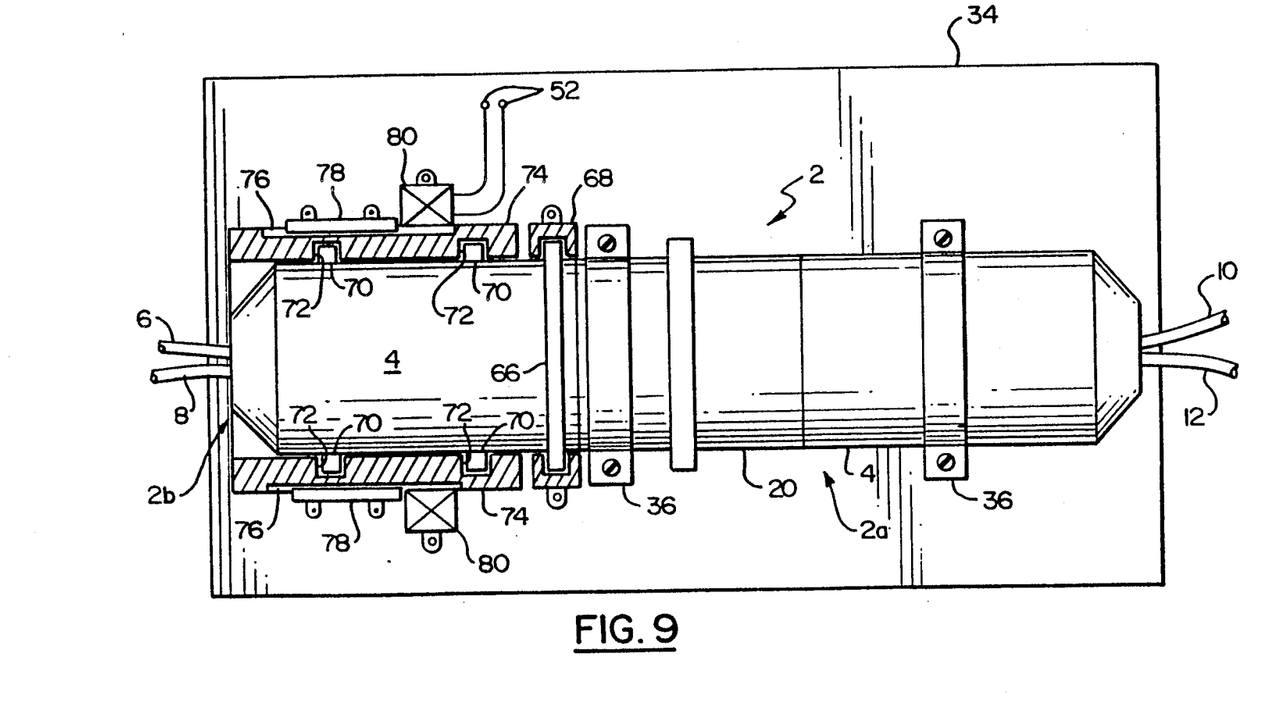
FIG. 9 shows schematically the switch of the present invention with another actuator assembly.

FIG. 9 shows the switch with a linear actuator in which the linear motion of the actuator is translated to rotary motion using a cam arrangement similar to that used in a zoom lens. A raised ring 66 is formed on the rotatable ferrule 4. The ring 66 is engaged within a groove formed in a mounting member 68 which is fixedly mounted to housing 34 to prevent any lateral movement of ferrule 4. A number of cam followers 70 are formed on ferrule 4. The cam followers 70 are disposed within cam grooves 72 formed within an actuating sleeve 74. Actuating sleeve 74 encompasses the rotatable ferrule 4 and is mounted for lateral motion. The actuating sleeve 74 has formed therein on its outer surface a number of longitudinal keyways 76 adapted to receive an equal number of keys 78 which are fixedly mounted to housing 34 to prevent rotation of the actuating sleeve 74.

A solenoid 80 is mounted to housing 34 and is disposed about the actuating sleeve 74 in such a manner that the actuating sleeve 74 functions as a solenoid plunger. The solenoid 80 is activated by an input signal connected to inputs 52 to drive the actuating sleeve 74 in either of two directions, to thereby rotate ferrule 4 through the interaction of the cam grooves 72 and cam followers 70.

A fail-safe arrangement can be implemented whereby a spring is provided to drive the actuating sleeve 74 in a first direction so that the solenoid winding 80 is used only to drive the sleeve in a second direction.

Figure 10:
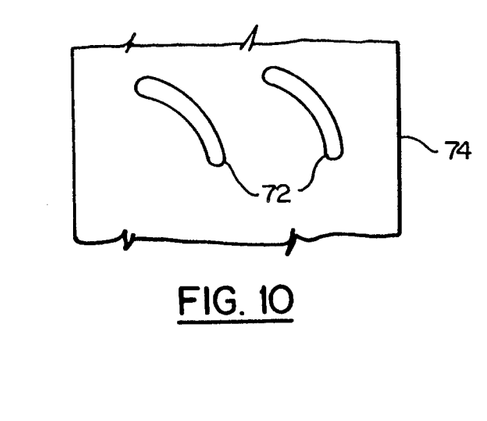
FIG. 10 shows a portion of the actuator assembly of FIG. 9.

FIG. 10 shows a portion of the inside surface of the actuating sleeve 74 having two cam grooves 72 formed therein. These grooves must be formed with sufficient precision that they rotate the ferrule 4 through the necessary arc and stop rotation in either direction at the desired alignment of the ferrule with the alignment sleeve 20. Alternatively, stop members could be adjustably mounted to housing 34 to limit the linear motion of the sleeve 74. It has been discovered that the force vs. displacement curve of linear solenoids is such that the force increases with displacement and therefore the cam grooves 72 are curved to compensate for this non-linear force vs. displacement curve of the solenoids.

From the above, it can be seen that the present invention makes use of existing fiber optic connector technology to provide an inexpensive fiber optic switch. The connector components provide for the axial alignment of the butt-joined fibers, and only the degree of rotation must be controlled. Manually actuated switches may be very easily provided at a cost heretofore not contemplated for switches having precision alignment. A relatively simple fiber optic bypass switch is provided for use in a fiber optic local area network. A vast number of actuator structures may be employed with the switch, and only a few examples have been described in the specification. Many equivalent structures could be provided.

What is claimed is:

1. A fiber optic switch comprising:
   first and second ferrules, each having a front surface and an aperture formed therethrough;
   at least one optical fiber mounted in said first ferrule along an axis offset from and parallel to an axis of the ferrule, said optical fiber terminating at a polished end surface disposed adjacent to said front surface;
   a plurality of optical fibers mounted in the second ferrule, each optical fiber being positioned along an axis, said axes being parallel to and offset from an axis of the ferrule, said optical fibers terminating at a polished end surface disposed adjacent said front surface of the second ferrule, the axes of all optical fibers in both ferrules being offset from the ferrule axes by the same distance; and
   means for rotatably mounting said ferrules for relative rotation with their front surfaces in juxtaposition and their axes aligned, so that one of said first and second ferrules may be rotated about its axis relative to the other ferrule, whereby the ferrules may be relatively rotated to selectively align and misalign the optical fibers mounted in said first and second ferrules.

2. A fiber optic switch, comprising:
   first and second ferrules, each having a front surface and an aperture formed therethrough;
   at least one optical fiber mounted in each ferrule along an axis offset from and parallel to an axis of the ferrule the axis of each optical fiber being offset from the ferrule axis by like distances, said optical fiber terminating at a polished end surface disposed adjacent said front surface; and
   means for rotatably mounting said ferrules for relative rotation with their front surfaces in juxtaposition and their axes aligned, so that the first ferrule can be rotated about its axis relative to the second ferrule, whereby the first ferrule may be rotated to selectively align or misalign the optical fibers mounted in said first and second ferrules.

3. A fiber optic switch as described in claim 2, wherein a plurality of optical fibers are mounted in each ferrule, each optical fiber being positioned along an axis, the axes of all said fibers being parallel to and offset from the axis of the ferrule by a like distance.

4. A fiber optic switch as described in claim 3, wherein two optical fibers are mounted in each ferrule said fibers in each ferrule being similarly positioned about the axis of the ferrule.

5. A fiber optic switch as described in claim 2, wherein the polished end surface of each fiber is slightly recessed from the front surface of the ferrule in which it is mounted, and said polished end surfaces are coated with an index-matching material.

6. A fiber optic switch as described in claim 2, wherein the optical fibers are mounted in the ferrules using an epoxy.

7. A fiber optic switch as described in claim 2, additionally comprising means for rotating said first ferrule in relation to said second ferrule.

8. A fiber optic switch as described in claim 7, wherein the means for rotating said first ferrule includes a rotating actuator.

9. A fiber optic switch as described in claim 8, wherein the rotating actuator comprises a DC motor.

10. A fiber optic switch as described in claim 9, additionally comprising:
    a gear train disposed between the motor and the first ferrule; and
    means for stopping said motor when proper alignment positions between said first and second ferrules are achieved.

11. A fiber optic switch as described in claim 10, wherein the means for stopping includes a stop member positioned at a radial distance from the ferrule axis that is greater than the radial distance of the optical fiber axis from the ferrule axis.

12. A fiber optical switch as described in claim 11, wherein the distance from the stop member to the ferrule axis is at least 100 times the distance between the optical fiber axis and the ferrule axis.

13. A fiber optic switch as described in claim 8, wherein said rotating actuator comprises a motor constructed around said switch with a stator portion mounted to said second ferrule and a rotor portion mounted to said first ferrule, whereby relative rotation between the first ferrule and the second ferrule may be achieved.

14. A fiber optic switch as described in claim 7, wherein the means for rotating comprises:
   a linear actuator; and
   cam means connected between the linear actuator and the first ferrule for converting linear motion of the actuator to rotation of the first ferrule.

15. A fiber optic switch as described in claim 7, additionally comprising spring means for driving said first ferrule to a first alignment position, said rotating means adapted to drive the ferrule to a second alignment position against the spring means, whereby a fail-safe operation is achieved, and the switch will revert to a known position in the event of a power failure.

16. A fiber optic switch as described in claim 2, wherein the optical fibers have equal diameters and the axes of the optical fibers are offset from the ferrule axes by like distances of at least one-half the diameter of the optical fibers.

17. A fiber optic switch as described in claim 2, wherein the first and second ferrules each have an aperture therethrough that is formed concentrically with the ferrule axis.

* * * * *